United States Patent
Morgia et al.

(10) Patent No.: US 11,603,943 B2
(45) Date of Patent: Mar. 14, 2023

(54) SELF-SEALING BREAKAWAY VALVE (71) Applicant: Spectrum Associates, Inc., Milford, CT (US)

(72) Inventors: James J. Morgia, Trumbull, CT (US); Kevin W. Elliott, II, Leonardtown, MD (US); Robert R. Dragonette, Jr., Monroe, CT (US); Matthew J. Schumacher, Shelton, CT (US)

(73) Assignee: SPECTRUM ASSOCIATES, INC., Milford, CT (US)

( * ) Notice: Subject to any disclaimer, the term of this patent is extended or adjusted under 35 U.S.C. 154(b) by 0 days.

(21) Appl. No.: 17/588,791

(22) Filed: Jan. 31, 2022

(65) Prior Publication Data

US 2022/0243835 A1 Aug. 4, 2022

Related U.S. Application Data (60) Provisional application No. 63/145,430, filed on Feb. 3, 2021.

(51) Int. Cl.
 *F16K 17/36* (2006.01)
(52) U.S. Cl.
 CPC ........ *F16K 17/36* (2013.01); *F16K 2200/204* (2021.08)
(58) Field of Classification Search
 CPC ........................... F16K 17/36; F16K 2200/204
 (Continued)

(56) References Cited

U.S. PATENT DOCUMENTS 3,630,214 A 12/1971 Levering
3,719,194 A 3/1973 Anderson
(Continued)

FOREIGN PATENT DOCUMENTS

CN 102818058 11/2013
GB 1396847 6/1975
(Continued)

OTHER PUBLICATIONS

Flomax International, Break Away Valves, (flomaxinternational.com) (2018).
(Continued)

*Primary Examiner* — Minh Q Le
(74) *Attorney, Agent, or Firm* — Ware, Fressola, Maguire & Barber LLP (57) ABSTRACT

The present invention is directed to a self-sealing breakaway valve having a poppet-style design. The breakaway valve may be made from two body portions coupled together by one or more frangible fasteners in order to form a flow path through the breakaway valve. Each body portion may include a valve mechanism responsive to separation of the two body portions from each other to cause closure of the flow path in the respective body portion. The valve mechanisms may be releasably coupled together by a coupling key configured to restrict movement of each valve mechanism, so that the flow path within the breakaway valve remains open. Upon separation of the two body portions from each other, the coupling key may be released from the valve mechanisms allowing for closure of the flow path by the valve mechanisms thereby preventing fluid leakage from the breakaway valve.

18 Claims, 10 Drawing Sheets

(58) Field of Classification Search
USPC .................................. 137/68.16, 68.11, 68.14
See application file for complete search history.

(56) References Cited

U.S. PATENT DOCUMENTS

| | | | | |
|---|---|---|---|---|
| 3,797,510 A * | 3/1974 | Torres | ................ | F16L 55/1007 137/614.04 |
| 3,921,656 A | 11/1975 | Meisenheimer | | |
| 4,090,524 A * | 5/1978 | Allread | .................. | F16L 29/00 137/68.15 |
| 4,232,697 A | 11/1980 | Meisenheimer | | |
| 4,295,484 A | 10/1981 | Meisenheimer | | |
| 4,376,445 A | 3/1983 | Meisenheimer | | |
| 4,392,513 A * | 7/1983 | Parrish | ................ | F16L 55/1015 285/1 |
| 4,614,201 A * | 9/1986 | King | ....................... | F16K 17/40 137/614.04 |
| 4,625,746 A | 12/1986 | Calvin | | |
| 4,643,216 A | 2/1987 | Allread | | |
| 4,674,525 A * | 6/1987 | Richards | ............. | F16L 55/1007 137/614.04 |
| 4,827,977 A * | 5/1989 | Fink, Jr. | ................... | F16K 17/36 137/614.04 |
| 4,899,786 A * | 2/1990 | Morris | ................ | F16L 55/1015 137/637.05 |
| 4,899,792 A * | 2/1990 | Podgers | .................... | B67D 7/42 285/272 |
| 4,921,000 A | 5/1990 | King | | |
| 5,054,509 A * | 10/1991 | Grantham | ........... | F16L 55/1007 137/68.14 |
| 5,092,363 A | 3/1992 | Vanderjagt | | |
| 5,165,439 A | 11/1992 | Krynicki | | |
| 5,186,202 A | 2/1993 | Meisenheimer | | |
| 5,285,807 A * | 2/1994 | Nitzberg | .................. | B67D 7/04 137/614.04 |
| 5,305,776 A * | 4/1994 | Romano | ............. | F16L 55/1007 137/68.14 |
| 5,351,708 A * | 10/1994 | Donato | ............... | F16L 55/1007 137/68.14 |
| 5,529,085 A * | 6/1996 | Richards | ............. | F16L 55/1007 137/68.15 |
| 5,791,366 A * | 8/1998 | Lo | ....................... | F16L 55/1007 137/614.04 |
| 5,826,610 A * | 10/1998 | Bodhaine | ................ | F16L 29/00 137/614.04 |
| 5,960,811 A | 10/1999 | Partridge | | |
| 6,192,934 B1 * | 2/2001 | Coates, III | .......... | F16L 55/1015 137/614.04 |
| 6,302,147 B1 | 10/2001 | Rose | | |
| 7,117,892 B2 | 10/2006 | Krywitsky | | |
| 7,252,112 B1 | 8/2007 | Imler | | |
| 8,127,785 B2 * | 3/2012 | Webber | ............... | F16L 55/1007 137/614.04 |
| 8,251,084 B2 * | 8/2012 | Brown | .................... | F16L 37/26 137/614.04 |
| 8,578,957 B2 * | 11/2013 | Wolff | .................. | F16L 55/1007 137/614.04 |
| 9,121,536 B2 * | 9/2015 | Cardona | .................. | F16L 37/30 |
| 9,528,648 B2 * | 12/2016 | Nanaji | .................. | F16L 37/113 |
| 9,611,949 B2 * | 4/2017 | Pelfrey | .................... | F16K 17/36 |
| 9,791,087 B2 | 10/2017 | Boothe | | |
| 10,935,177 B2 * | 3/2021 | Lliesköld | .......... | F16L 55/1007 |
| 2004/0123899 A1 | 7/2004 | Turvey | | |
| 2021/0190250 A1 * | 6/2021 | Bäckström | .......... | F16L 55/1015 |

FOREIGN PATENT DOCUMENTS

| | | |
|---|---|---|
| GB | 2076917 | 12/1981 |
| KR | 102090820 | 3/2020 |

OTHER PUBLICATIONS

Guyson, Mann Tek safety break-away couplings, (https://www.guyson.co.uk/hose-couplings/dry-break-fluid-transfer-couplings/mann-tek-intro-page/mann-tek-break-away-couplings) (Sep. 29, 2020).
Parker, Breakaway Valve, (https://ph.parker.com/us/en/breakaway-valve) (Accessed: Jun. 16, 2021).
Spectrum Associates, Inc., BALVAC 14000 Series Self-Sealing Breakaway Fuel Valves (couplings) for crash-resistant fuel systems. Milford, CT (2016).
Teesing, Breakaway Couplings, (www.teesing.com/en/page/product-information/test-and-fill-connectors/breakaway-couplings) (May 2, 2016).

* cited by examiner

SELF-SEALING BREAKAWAY VALVE

CROSS-REFERENCE TO RELATED APPLICATIONS

This application claims priority to U.S. Provisional Appl. No. 63/145,430 filed Feb. 3, 2021, which is hereby incorporated by reference in its entirety.

BACKGROUND OF THE INVENTION

1. Field of the Invention

The present invention is directed to a self-sealing breakaway valve, and more particularly to an axial self-sealing breakaway valve having a poppet-style design.

2. Related Art

Self-closing valve assemblies are typically installed in the fuel lines of aircraft or other vehicles in positions where the fuel lines may be fractured in a crash or other impact. Without the self-closing valve assembly, a fractured fuel line would cause fuel within the fuel line and/or fuel tanks connected thereto to leak and cause and/or contribute to a fire.

For example, U.S. Pat. No. 3,719,194 is directed to a breakaway coupling including two coupling bodies, each incorporating a tubular valve member and a nose equipped with an elastomer ring which serves as a seat to cooperate with the corresponding tubular valve member. Each of the two tubular valve members is urged towards a closed position against the corresponding elastomer ring by a compression spring. The two tubular valve members are normally held in a retracted open position by abutment against a corresponding latch member in the form of an angular trigger, where each tubular valve member abuts the outer edge of the longer arm of the angular trigger and thrusts the angular trigger against the confronting nose of the other coupling body. Initial separation of the coupling bodies allows the two tubular valve members to slide the longer arms of each angular trigger until the longer arms clear the inner circumferential surfaces and are free to move radially outwardly, thereby causing the two tubular valve members to snap shut as a result of the corresponding valve springs.

Another example is U.S. Pat. No. 4,090,524, which is directed to a frangible valved fitting including annular rings each having a flapper valve of generally circular configuration. The flapper valves are maintained in the open position under normal operating conditions by a pair of diametrically opposed axially extending pins having ends received within recesses defined in the rings. If the fitting pulls apart, such as during an aircraft crash, the pins will fall from their recesses, and the annular rings will be biased so that the flapper valves are closed into a sealed relationship with valve seats.

U.S. Pat. No. 5,826,610 is directed to a breakaway coupling device that includes opposed check valves configured to keep each other open when the female valve body and male valve body are coupled together. When the female valve body is separate from the male valve body the check valves are no longer in contact, and the springs urge each check valve closed.

U.S. Pat. No. 3,630,214 is directed to a coupling, which connects fuel or oil tanks, lines, and fittings on helicopters and other aircraft, comprising an elongated body having fittings at opposite ends for securing to a fuel tank, hose line or the like. The central portion of the body is of thin-walled construction, thus providing a frangible neck. The body is lined with a rubberlike tube extending between the fittings and secured to the body by bonding only at its end portions so that the remainder is free to stretch. A pair of poppet valves adjacent the fittings are spring urged toward closed positions, seating against the opposite ends of the rubber liner. However, these valves are held in their open positions by a two-piece rod having a scarfed joint connected by a shear pin, so that compression, bending, or shear forces which break the frangible neck will cause the rod to collapse or dislodge itself from the valves, permitting the valves to close.

SUMMARY OF THE INVENTION

In accordance with exemplary aspects of the present invention, a self-sealing breakaway valve that may be used in connection with any fluid lines, for example fuel lines, is provided so that if there is relative movement of the fluid lines as a result of an impact or crash leakage of the fluid lines is minimized or prevented altogether.

The self-sealing breakaway valve may be used with ground vehicles, air vehicles, such as aircraft whether manned or unmanned, or stationary fueling equipment.

It is an object of the present invention to provide a self-sealing breakaway valve that meets FAR C.F.R. Part 25, Part 27, Part 29, and EASA requirements for aircraft.

It is another object of the present invention to provide a self-sealing valve that cannot inadvertently close unless the housings are physically moved away from each other by at least some axial distance.

It is another object of the present invention to provide a self-sealing breakaway valve having a condensed axial poppet-style design in order to reduce the amount of space required for installation so the self-sealing breakaway valve may be advantageously used in small aircraft.

It is still another object of the present invention to provide a self-sealing breakaway valve that is more space and weight efficient than flexible hoses, and has better flow efficiency than longer hoses.

It is yet another object of the present invention to provide a self-sealing breakaway valve that has frangibility 360 degrees around its longitudinal axis.

It is another object of the present invention to provide a self-sealing breakaway valve with non-complex machining so the self-sealing breakaway valve is cost-efficient to produce.

It is yet another object of the present invention to provide a self-sealing breakaway valve having a minimal part count.

It is still another object of the present invention to provide a self-sealing breakaway valve having increased frangible fastener torques in order to minimize the effects of preload and/or fatigue.

It is another object of the present invention to provide a self-sealing breakaway valve that is configured for double or single breaks, and is not load application direction dependent.

It is yet another object of the present invention to provide a self-sealing breakaway valve that includes a visual indication as to whether the self-sealing breakaway valve is in the open or closed, i.e., sealed, configuration.

It is still another object of the present invention to provide a self-sealing breakaway valve that has electrical conductivity through its components.

It is another object of the present invention to provide a self-sealing breakaway valve that has a high vibration resistance capability.

It is yet another object of the present invention to provide a self-sealing breakaway valve that has high reliability for use in greater than 60,000 flight hours.

It is still another object of the present invention to provide a self-sealing breakaway valve that is reusable.

It is another object of the present invention to provide a self-sealing breakaway valve that is configured for use with different sized end fittings, for example, 0.50 to 0.75 equivalent bore diameter.

It is yet another object of the present invention to provide a self-sealing breakaway valve that is configured to be partial separation sealing compliant.

It is still another object of the present invention to provide a self-sealing breakaway valve that is configured for use with a variety of separation loads and modes.

It is another object of the present invention to provide a self-sealing breakaway valve that allows for low turbulence and high flow efficiency.

It is yet another object of the present invention to provide a self-sealing breakaway valve in which the sealing mechanisms is out of the flowpath and insensitive to contaminated fuel.

The foregoing objects and others are obtained through the exemplary embodiments of the self-sealing breakaway valve discussed further hereinafter.

In accordance with exemplary embodiments of the present invention, the present invention is directed to a self-sealing breakaway valve having a poppet-style design. The breakaway valve may be made from two body portions coupled together by one or more frangible fasteners in order to form a flow path through the breakaway valve. Each body portion may include a valve mechanism responsive to separation of the two body portions from each other to cause closure of the flow path in the respective body portion. The valve mechanisms may be releasably coupled together by a coupling key configured to restrict movement of each valve mechanism, so that the flow path within the breakaway valve remains open. Upon separation of the two body portions from each other, the coupling key may be released from the valve mechanisms allowing for closure of the flow path by the valve mechanisms thereby preventing fluid leakage from the breakaway valve.

In accordance with exemplary embodiments of the present invention, a breakaway valve is provided having a first body portion with a first coupling end defining a first opening and a first centerbody positioned within the first body portion, a second body portion frangibly coupled to the first body portion, and with a second coupling end defining a second opening and a second centerbody positioned within the second body portion, a first valve mechanism movable between the first centerbody and the first opening, a second valve mechanism movable between the second centerbody and the second opening, a first valve spring positioned between the first valve mechanism and first centerbody and configured to urge the first valve mechanism in a direction towards the first opening, a second valve spring positioned between the second valve mechanism and second centerbody and configured to urge the second valve mechanism in a direction towards the second opening.

In accordance with this and other exemplary embodiments of the present invention, the breakaway valve may include a first pin operatively coupled to the first valve mechanism and engaged with a first ramp positioned within the first centerbody so movement of the first valve mechanism by the first valve spring in the direction towards the first opening results in rotational movement of the first valve mechanism about the longitudinal axis of the first valve mechanism, a second pin operatively coupled to the second valve mechanism and engaged with a second ramp positioned within the second centerbody configured so movement of the second valve mechanism by the second valve spring in the direction towards the second opening results in rotational movement of the second valve mechanism about the longitudinal axis of the second valve mechanism, and a coupling key configured to operatively engage with the first valve mechanism and the second valve mechanism to inhibit rotational movement of the first valve mechanism about the longitudinal axis of the first valve mechanism and rotational movement of the second valve mechanism about the longitudinal axis of the second valve mechanism.

In accordance with this and other exemplary embodiments of the present invention, the breakaway valve may have the first body portion and the second body portion coupled together by one or more frangible fasteners to define a flow path through the breakaway valve from the first opening to the second opening.

In accordance with this and other exemplary embodiments of the present invention, the breakaway valve may have the first body portion include a first flange positioned around the periphery of the first body portion, the second body portion include a second flange positioned around the periphery of the second body portion.

In accordance with this and other exemplary embodiments of the present invention, the breakaway valve may have the first flange and second flange be configured to couple the first body portion and the second body portion together by one or more frangible fasteners.

In accordance with this and other exemplary embodiments of the present invention, the breakaway valve may have the first centerbody include at least one recess configured for receipt of the coupling key, and the first valve mechanism include a notch configured for receipt of the coupling key.

In accordance with this and other exemplary embodiments of the present invention, the breakaway valve may inhibit rotational movement of the first valve mechanism about the longitudinal axis of the first valve mechanism when the coupling key is aligned in the at least one recess and the notch.

In accordance with this and other exemplary embodiments of the present invention, the breakaway valve may have the second centerbody include at least one recess configured for receipt of the coupling key, the second valve mechanism include a notch configured for receipt of the coupling key.

In accordance with this and other exemplary embodiments of the present invention, the breakaway valve may inhibit rotational movement of the second valve mechanism about the longitudinal axis of the second valve mechanism when the coupling key is aligned in the at least one recess and the notch.

In accordance with this and other exemplary embodiments of the present invention, the breakaway valve may have the first pin and the first ramp have a cam engagement such that first pin follows a contour surface of the first ramp to impart rotational movement to the first valve mechanism.

In accordance with this and other exemplary embodiments of the present invention, the breakaway valve may have the second pin and the second ramp have a cam engagement such that the second pin follows a contour surface of the second ramp to impart rotational movement to the second valve mechanism.

In accordance with this and other exemplary embodiments of the present invention, the breakaway valve may include a first face seal positioned between the first opening and the first valve mechanism, and the first valve mechanism is configured to cause closure of the flow path when urged against the first face seal by the first valve spring.

In accordance with this and other exemplary embodiments of the present invention, the breakaway valve may include a second face seal positioned between the second opening and the second valve mechanism, and the second valve mechanism is configured to cause closure of the flow path when urged against the second face seal by the second valve spring.

In accordance with this and other exemplary embodiments of the present invention, the breakaway valve may have the first valve spring configured to move the first valve mechanism rectilinearly along the longitudinal axis of the first valve mechanism, and the second valve spring configured to move the second valve mechanism rectilinearly along the longitudinal axis of the second valve mechanism.

In accordance with this and other exemplary embodiments of the present invention, the breakaway valve may have the engagement between the first pin and the first ramp inhibit rectilinear movement of the first valve mechanism when the coupling key is operatively engaged with the first valve mechanism, and the engagement between the second pin and the second ramp inhibit rectilinear movement of the second valve mechanism when the coupling key is operatively engaged with the second valve mechanism.

In accordance with this and other exemplary embodiments of the present invention, the breakaway valve may have the coupling key configured for disengagement from the first valve mechanism when the first body portion is separated from the second body portion.

In accordance with this and other exemplary embodiments of the present invention, the breakaway valve may have the coupling key configured for disengagement from the second valve mechanism when the second body portion is separated from the first body portion.

In accordance with this and other exemplary embodiments of the present invention, the breakaway valve may have the coupling key configured for disengagement from the at least one recess and/or the notch when the first body portion is separated from the second body portion.

In accordance with this and other exemplary embodiments of the present invention, the breakaway valve may have the coupling key configured for disengagement from the at least one recess and/or the notch when the second body portion is separated from the first body portion.

In accordance with this and other exemplary embodiments of the present invention, the breakaway valve may have disengagement of the coupling key from the at least one recess and/or the notch allow for rotational movement of the first valve mechanism about the longitudinal axis of the first valve mechanism and urging of the first valve mechanism towards the first opening by the first valve spring.

In accordance with this and other exemplary embodiments of the present invention, the breakaway valve may have disengagement of the coupling key from the at least one recess and/or the notch allow for rotational movement of the second valve mechanism about the longitudinal axis of the second valve mechanism and urging of the second valve mechanism towards the second opening by the second valve spring.

In accordance with this and other exemplary embodiments of the present invention, the breakaway valve may include a first pop-up visual indicator movable between an extended position above the first body portion and a retracted position below the first body portion.

In accordance with this and other exemplary embodiments of the present invention, the breakaway valve may include a second pop-up visual indicator movable between an extended position above the second body portion and a retracted position below the second body portion.

In accordance with this and other exemplary embodiments of the present invention, the breakaway valve may have the first pop-up visual indicator configured to be in the extended position when the first valve spring moves the first valve mechanism in the direction of the first opening.

In accordance with this and other exemplary embodiments of the present invention, the breakaway valve may have the second pop-up visual indicator configured to be in the extended position when the second valve spring moves the second valve mechanism in the direction of the second opening.

BRIEF DESCRIPTION OF THE SEVERAL VIEWS OF THE DRAWINGS

For a fuller understanding of the nature and object of the present invention, reference should be had to the following detailed description taken in connection with the accompanying drawings, in which.

DETAILED DESCRIPTION OF THE INVENTION

The present invention now will be described more fully hereinafter with reference to the accompanying figures, in which exemplary embodiments of the invention are shown. The invention may, however, be embodied in many different forms and should not be construed as limited to the embodiments set forth herein. Like reference numerals refer to like elements throughout.

Referring now to FIGS. 1-10, therein illustrated is an exemplary breakaway valve, generally indicated by reference numeral 10. The breakaway valve 10 may include a first body portion 12 and a second body portion 14 configured to be operatively joined so as to form the breakaway valve 10. The first body portion 12 may include a coupling end 16 having an opening 18 formed therein and having a mechanism 20, for example threads, for connecting the first body portion 12 to a pipe, hose, line or the like (not shown) either directly or indirectly through the use of a fitting, coupling or the like (not shown). The first body portion 12 may also include a flange 22 extending circumferentially around the first body portion 12, and a centerbody 24 formed within the first body portion 12. The centerbody 24 may be formed so that fluid may pass through the first body portion 12 either entering from or exiting to the opening 18 of the coupling end 16. In other words, the centerbody 24 does not completely obstruct the passage of fluid through the first body portion 12, and may be, for example, a columnar structure positioned within the first body portion 12. The centerbody 24 may include one or more recesses 25 formed therein. The recesses 25 may be positioned so as to be diametrically opposed relative to one another. The first body portion 12 may also include a flow guide 26 positioned so as to create an advantageous flow path for the transition between the coupling end 16 and interior region of the first body portion 12.

The first body portion 12 may further include a valve mechanism 28 positioned within the centerbody 24. The valve mechanism 28 may include a notch 29 formed in one end thereof, and the notch 29 may be positioned so as to be aligned with the one or more recesses 25 of the centerbody 24. The valve mechanism 28 may be operatively coupled to a valve spring 30 that is configured to urge the valve mechanism 28 in a direction away from the centerbody 24 and towards the opening 18 of the coupling end 16. A pin 31 and ramp 33 mechanism may be employed to act as a guide for movement of the valve mechanism 28 relative to the centerbody 24. The first body portion 12 may also include a face seal 32 positioned adjacent to the opening 18 of the coupling end 16. The face seal 32 is dimensioned and positioned so as to form a sealing engagement with the valve mechanism 28 when the valve mechanism 28 is urged toward the coupling end 16 by the valve spring 30. The valve mechanism 28 may include a ring extension 34 positioned so as to operatively engage with a pop-up visual indicator 36. The pop-up visual indicator 36 is disposed within the centerbody 24 and may include a foot portion 38 that engages with the ring extension 34 of the valve mechanism 28. A visual indicator spring 40 may also be disposed within the centerbody 24 and configured to urge the pop-up visual indicator 36 in a direction away from the valve mechanism 28.

Referring now to FIGS. 1-4, similar in construction to the first body portion 12, the second body portion 14 may also include a coupling end 42 having an opening 44 formed therein and having a mechanism 46, for example threads, for connecting the second body portion 14 to a pipe, hose, line or the like (not shown) either directly or indirectly through the use of a fitting, coupling or the like (not shown). The second body portion 14 may also include a flange 48 extending circumferentially around the second body portion 14, and a centerbody 50 formed within the second body portion 14. The centerbody 50 may be formed so that fluid may pass through the second body portion 14 either entering from or exiting to the opening 44 of the coupling end 42. In other words, the centerbody 50 does not completely obstruct the passage of fluid through the second body portion 14, and may be, for example, a columnar structure positioned within the second body portion 14. The centerbody 50 may include one or more recesses 51 formed therein. The recesses 51 may be positioned diametrically opposed to one another. The second body portion 14 may also include a flow guide 52 positioned so as to create an advantageous flow path (low pressure drop) for the transition between the coupling end 42 and interior region of the second body portion 14. The second body portion 14 may further include a valve mechanism 54 positioned within the centerbody 50. The valve mechanism 54 may include a notch 55 formed in one end thereof, and the notch 55 may be positioned so as to be aligned with the one or more recesses 51 of the centerbody 50. The valve mechanism 54 may be operatively coupled to a valve spring 56 that is configured to urge the valve mechanism 54 in a direction away from the centerbody 50 and towards the opening 44 of the coupling end 42. A pin 57 and ramp 59 mechanism may be employed to act as a guide for movement of the valve mechanism 54 relative to the centerbody 50. The second body portion 14 may also include a face seal 58 positioned adjacent to the opening 44 of the coupling end 42. The face seal 58 is dimensioned and positioned so as to form a sealing engagement with the valve mechanism 54 when the valve mechanism 54 is urged toward the coupling end 42 by the valve spring 56. The valve mechanism 54 may include a ring extension 60 positioned so as to operatively engage with a pop-up visual indicator 62. The pop-up visual indicator 62 is disposed within the centerbody 50 and may include a foot portion 64 that engages with the ring extension 60 of the valve mechanism 54. A visual indicator spring 66 may also be disposed within the centerbody 50 and configured to urge the pop-up visual indicator 62 in a direction away from the valve mechanism 54.

Still referring to FIGS. 1-4, the first body portion 12 and the second body portion 14 of the breakaway valve 10 may be connected together by one or more frangible fasteners 68 connecting the flanges 22, 48 of each body portion 12, 14. The one or more frangible fasteners 68 may be screws, bolts, studs or the like, and may either pass through the flanges 22, 48 or be configured to thread directly into one of the flanges 22, 48. The one or more frangible fasteners 68 may be positioned in the flanges 22, 48 at desired locations around the perimeters of the first body portion 12 and the second body portion 14 so as to sufficiently secure the first body portion 12 to the second body portion 14. One or more partial separation seals 70 may be positioned between the first body portion 12 and the second body portion 14. The valve mechanism 28 of the first body portion 12 may be frangibly coupled to the valve mechanism 54 of the second body portion 14 by a coupling key 72. The coupling key 72 is configured to engage with the notches 29, 55 of the valve mechanisms 28, 54, and is also configured to engage with the one or more recesses 25, 51 of the centerbodies 24, 50. As discussed further below, the coupling key 72 connects the valve mechanism 28 to the valve mechanism 54 together and retains the valve mechanisms 28, 54 in an open configuration against the urging of the valve springs 30, 56. In the open configuration, the coupling key 72 prevents the valve mechanism 28 and the valve mechanism 54 from moving away from each other as a result of inhibiting rotation of the valve mechanisms 28, 54 so that movement of the valve mechanisms 28, 54 is constrained by the interaction of the respective pins 31, 57 and ramps 33, 59 as discussed further below.

Referring now to FIGS. 2-10, an exemplary operation and use of the breakaway valve 10 will now be discussed. While the first body portion 12, and portions thereof, are only illustrated in FIGS. 5-10 it is understood that the corresponding components of the second body portion 14 interact and operate in the same manner even though not specifically illustrated by FIGS. 5-10. The breakaway valve 10 may be installed in a fuel line (not shown) of a land or air vehicle, for example an aircraft, by attaching the coupling end 16 of the first body portion 12 to an end of the fuel line through the mechanism 20, and attaching the coupling end 42 of the second body portion 14 to another end of the fuel line through the mechanism 46 so that an uninterrupted flow of fuel is provided. It is understood that the fuel may flow into or out of either coupling end 16, 42, and that the breakaway valve 10 is not limited by any particular fuel flow direction. In other words, the direction of flow through the breakaway valve 10 is interchangeable. The breakaway valve 10 is generally positionable between an open configuration, as shown for example in FIG. 2, and a closed configuration, as shown for example in FIGS. 3 and 4. In the open configuration (see FIG. 2), the valve mechanisms 28, 54 are retained together by the coupling key 72 so that the valve mechanisms 28, 54 are spaced apart from the respective face seals 32, 58, and fuel, or other liquids, can flow through the breakaway valve 10. The fuel, or other liquids, are not obstructed by either of the valve mechanisms 28, 54 when the valve mechanisms 28, 54 are retained by the coupling key 72.

Referring specifically to FIGS. 5-10, the retention of the valve mechanism 28 of the first body portion 12 by the coupling key 72 will be discussed in greater detail. It is understood that the retention of the valve mechanism 54 of the second body portion 14 by the coupling key 72 operates in the same manner. When the coupling key 72 is engaged in the notch 29 of the valve mechanism 28 and the one or more recesses 25 of the centerbody 24, rotational movement of the valve mechanism 28 about its longitudinal axis is inhibited. As a result, the pin 31 cannot travel along the ramp 33, since further movement of the pin 31 requires rotational movement of the valve mechanism 28, and as a result, the valve mechanism 28 is retained spaced apart from the face seal 32 despite the urging of the valve spring 30.

In the closed configuration (FIGS. 3 and 4), as a result of an external load being applied to the breakaway valve 10, from an impact for example, one or more of the frangible fasteners 68 have been broken causing at least partial separation of the first body portion 12 from the second body portion 14. Since the frangible fasteners 68 no longer hold the flanges 22, 48 together the force is applied to the coupling key 72 as a result of separation of the first body portion 12 from the second body portion 14, resulting in separation of the coupling key 72 from one or both of the valve mechanisms 28, 54. This separation of the coupling key 72 causes the coupling key 72 to become dislodged from the recesses 25, 51 and notches 29, 55. With the coupling key 72 no longer inhibiting rotation of the valve mechanisms 28, 54 and commensurate movement of the pins 31, 57 along the ramps 33, 59, the valve springs 30, 56 urge the valve mechanisms 28, 54 in opposition directions towards the respective coupling ends 16, 42. The valve mechanisms 28, 54 are then further urged into a sealing contact with the respective face seals 32, 58 so that the breakaway valve 10 is in the closed configuration. In the closed configuration, flow of fuel, or other liquid, is prevented. In this manner, the breakaway valve 10 inhibits the leakage and/or spillage of fuel, or other liquids, resulting from an impact of sufficient force to separate the first body portion 12 from the second body portion 14 by enough of a distance, for example 0.03 inches, to uncouple the coupling key 72 from the notches 29, 55 of the valve mechanisms 28, 54.

Figure 1:
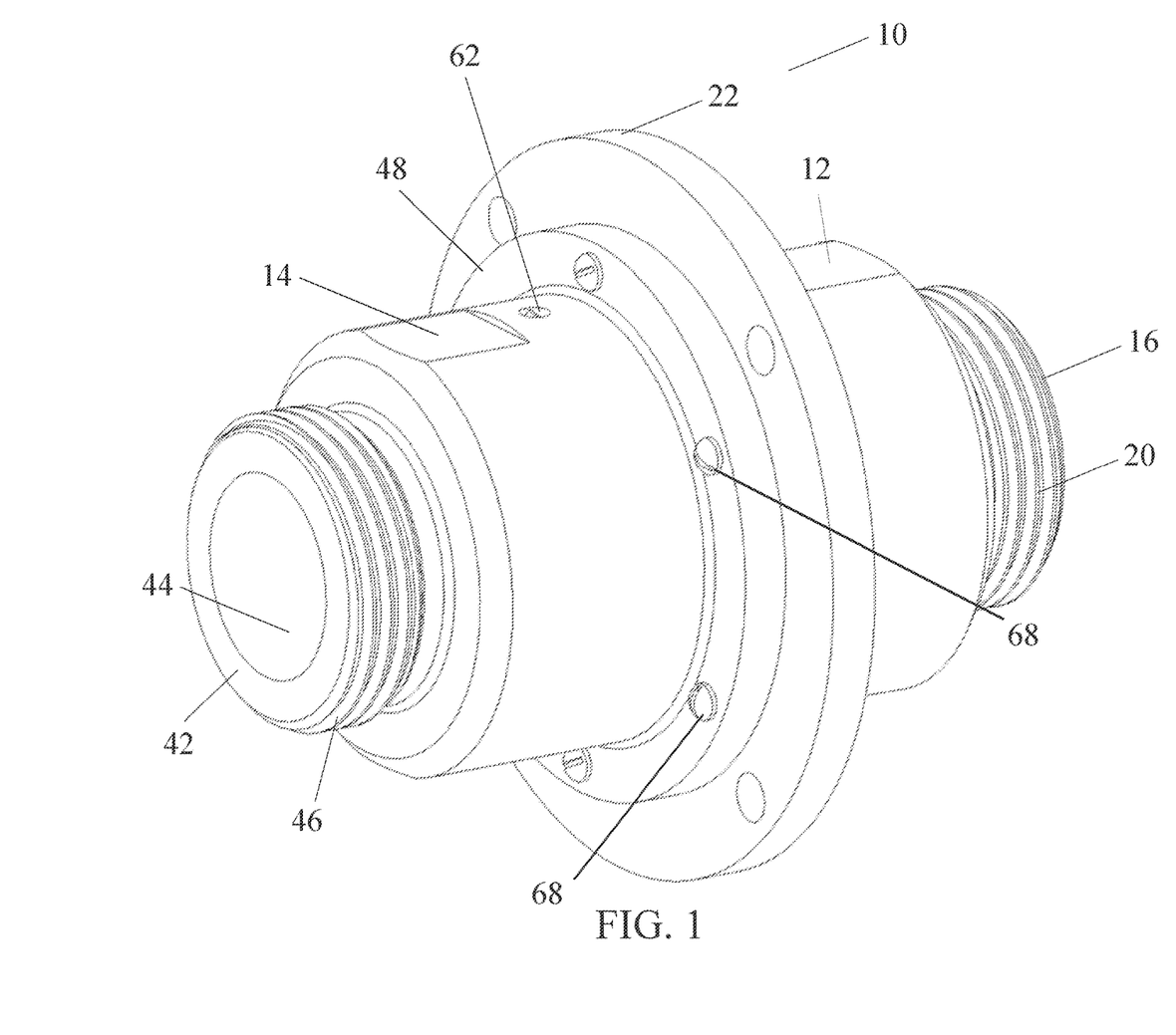
FIG. 1 is a perspective view of an exemplary self-sealing breakaway valve according to the present invention.
Figure 2:
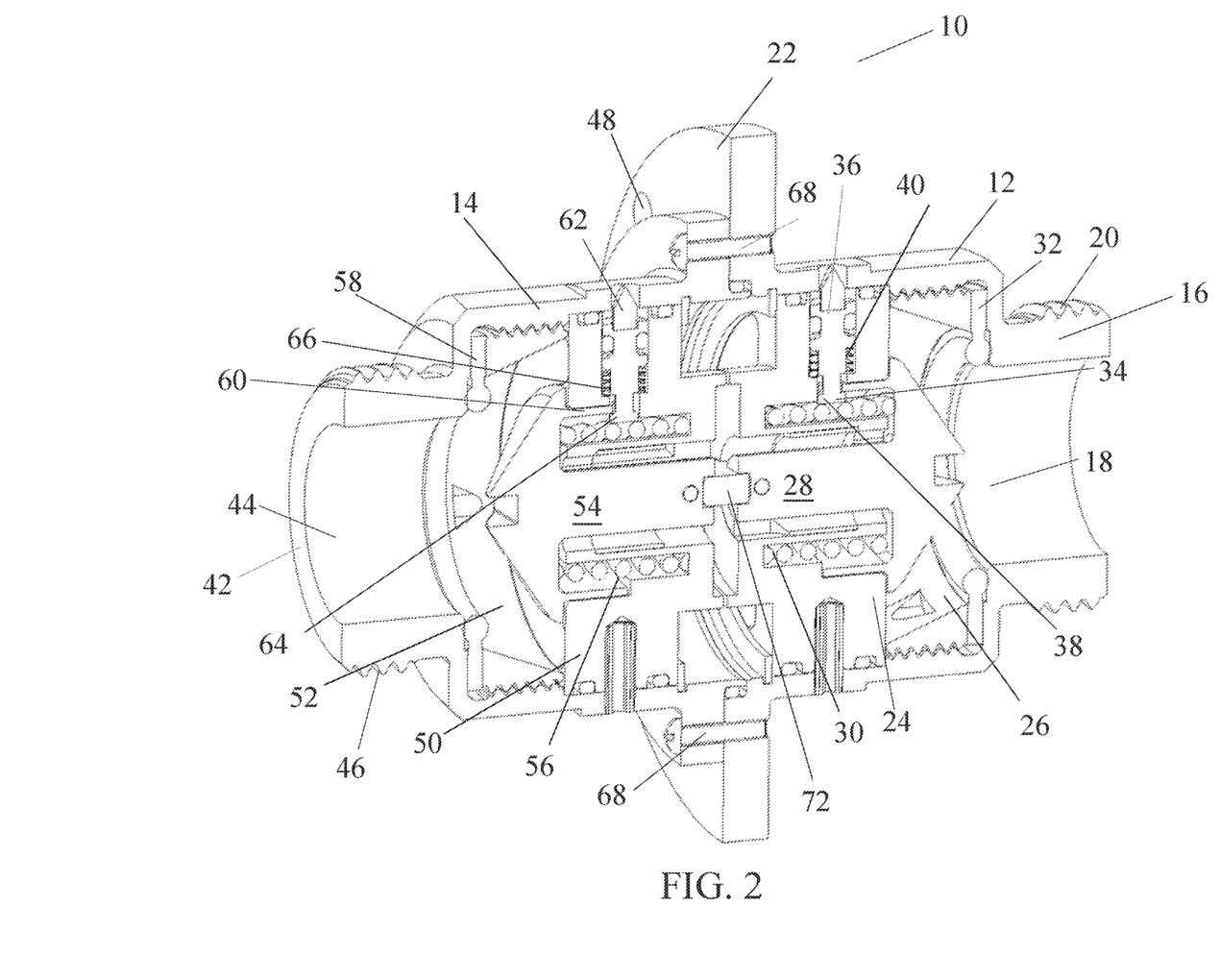
FIG. 2 is a cross-sectional view of the exemplary self-sealing breakaway valve of FIG. 1 in an open configuration.
Figure 3:
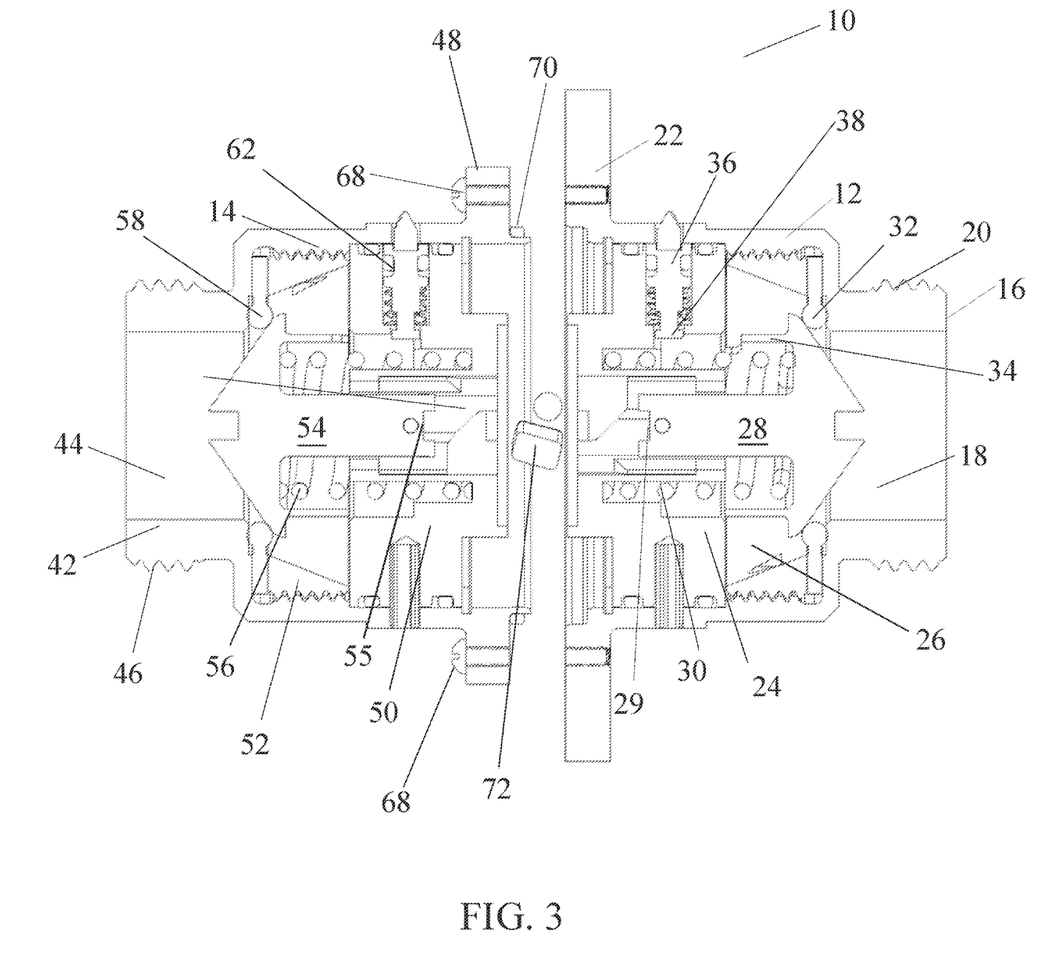
FIG. 3 is a cross-sectional view of the exemplary self-sealing breakaway valve of FIG. 1 in closed configuration.
Figure 4:
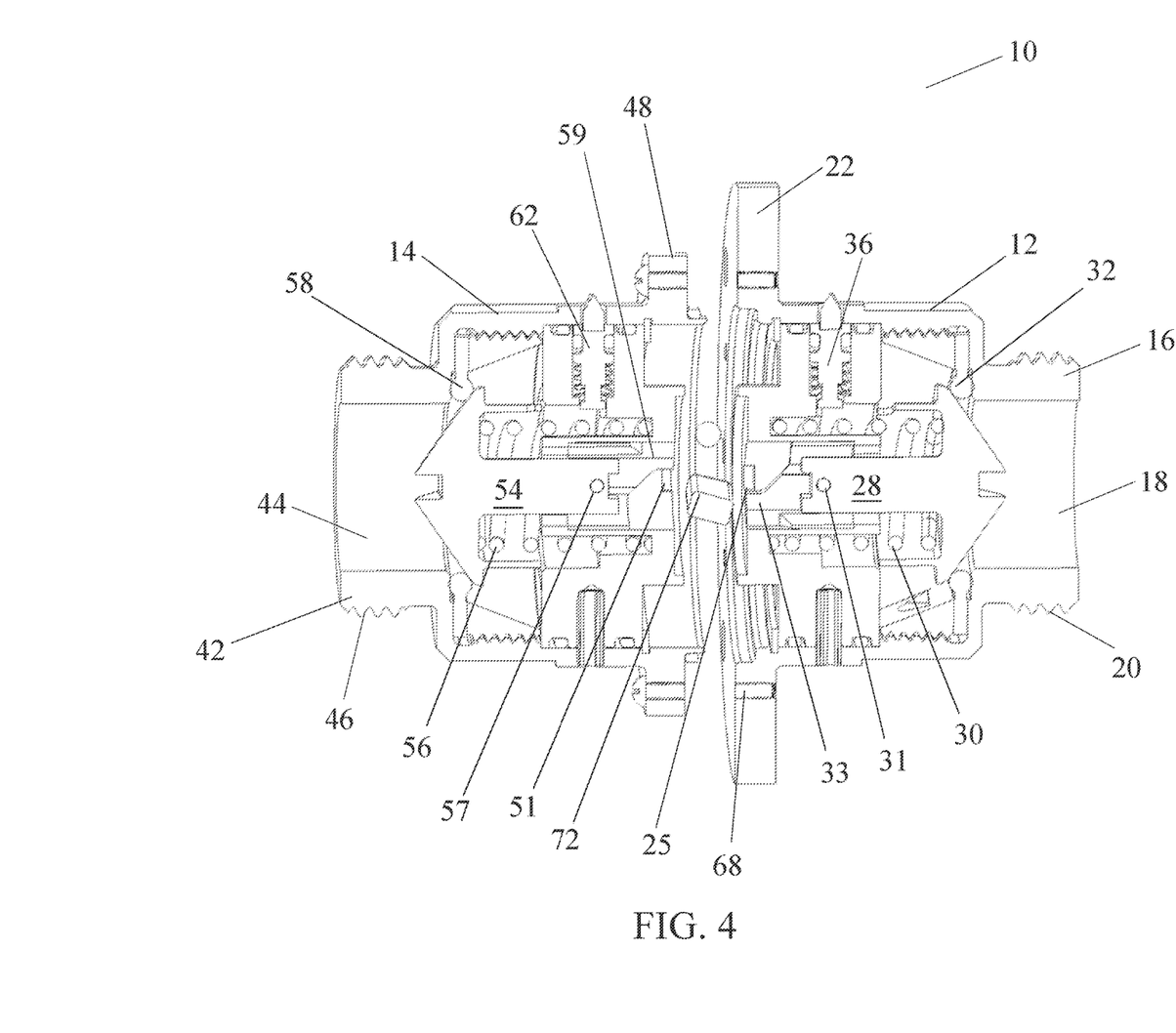
FIG. 4 is a cross-sectional view of the exemplary self-sealing breakaway valve of FIG. 1 in a closed configuration.
Figure 5:
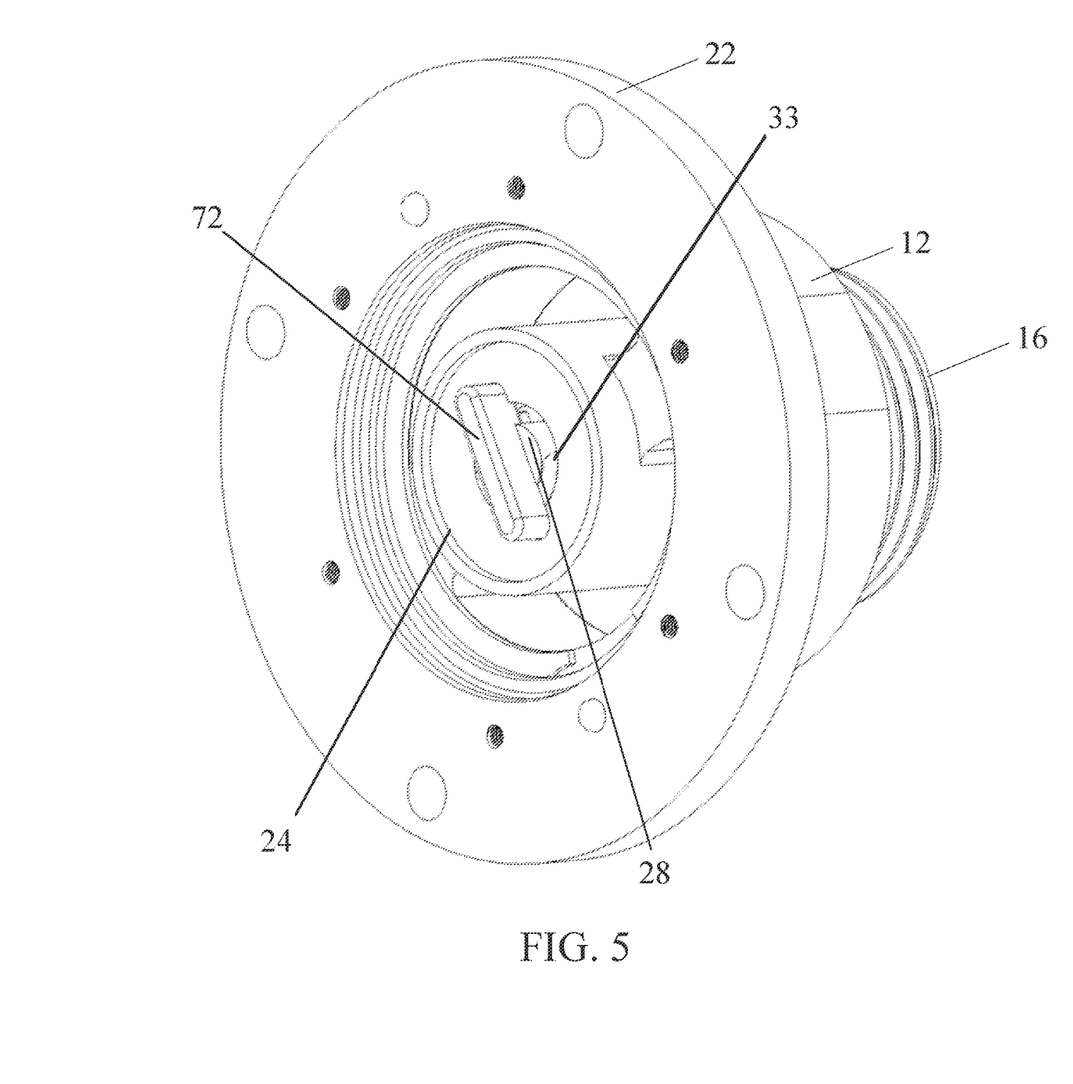
FIG. 5 is a perspective view of an exemplary body portion of the exemplary self-sealing breakaway valve.
Figure 6:
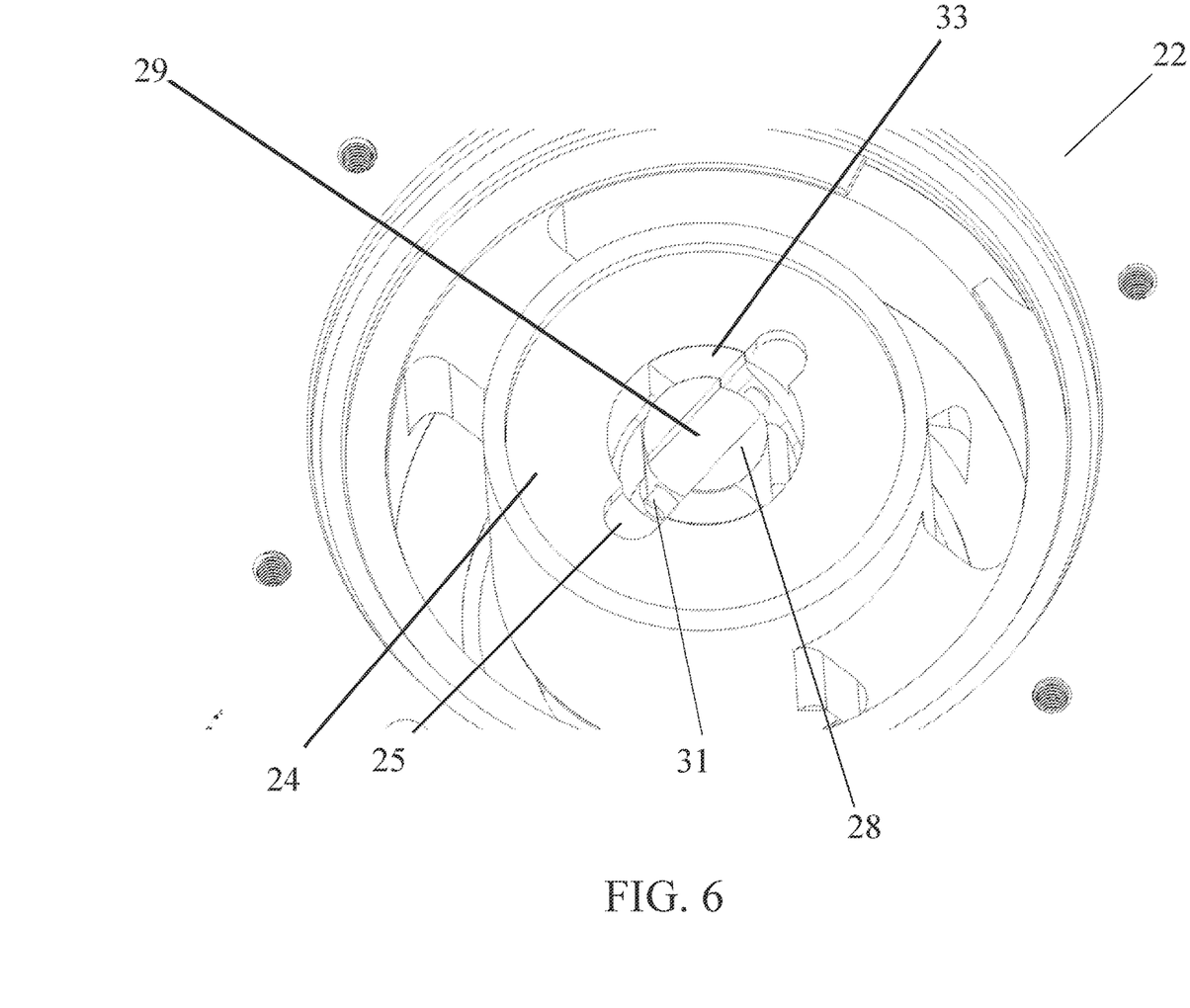
FIG. 6. is an enlarged perspective view of the exemplary body portion of FIG. 5 with certain components removed for clarity.
Figure 7:
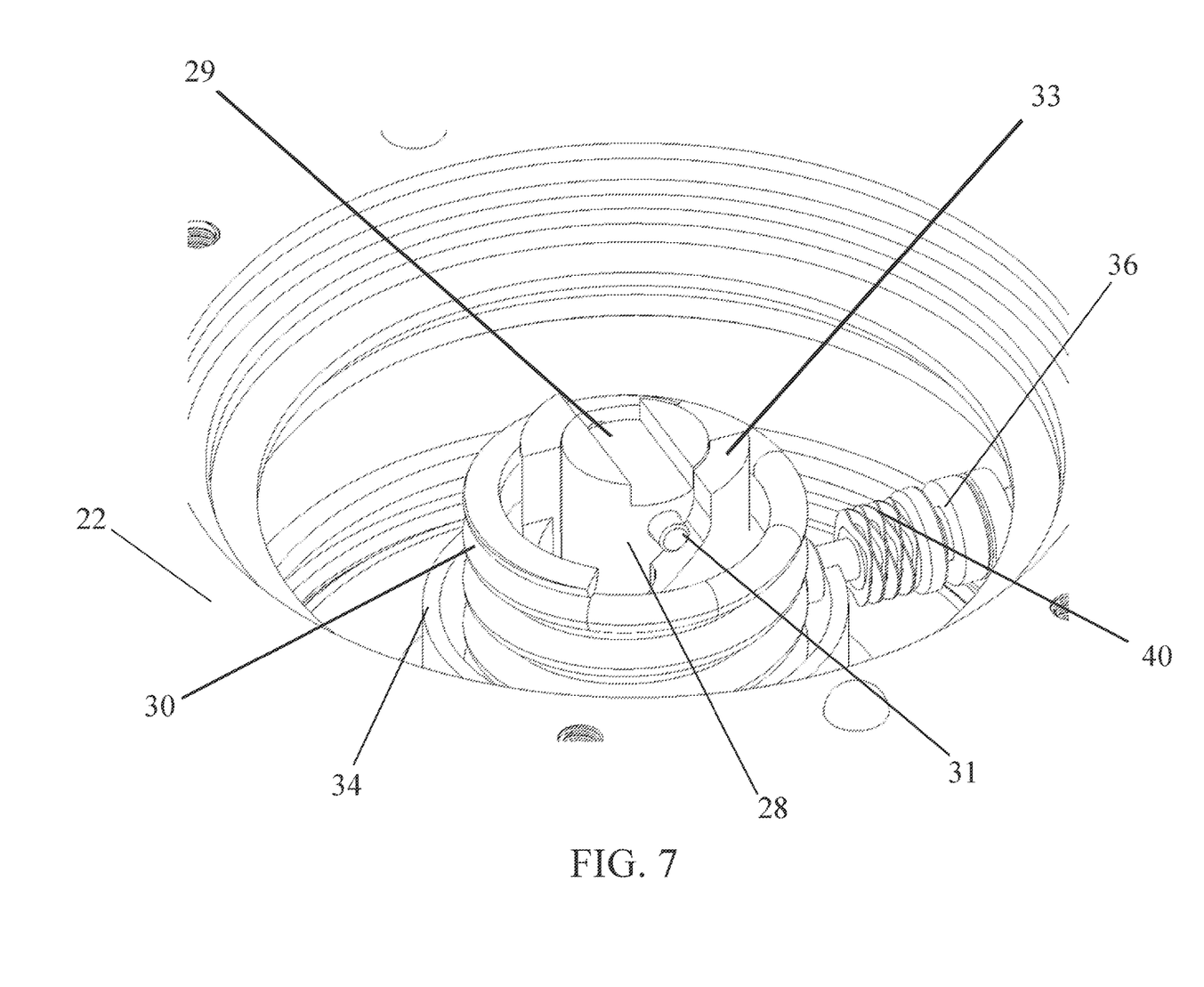
FIG. 7 is an enlarged perspective view of the exemplary body portion of FIG. 5 with certain components removed for clarity.
Figure 8:
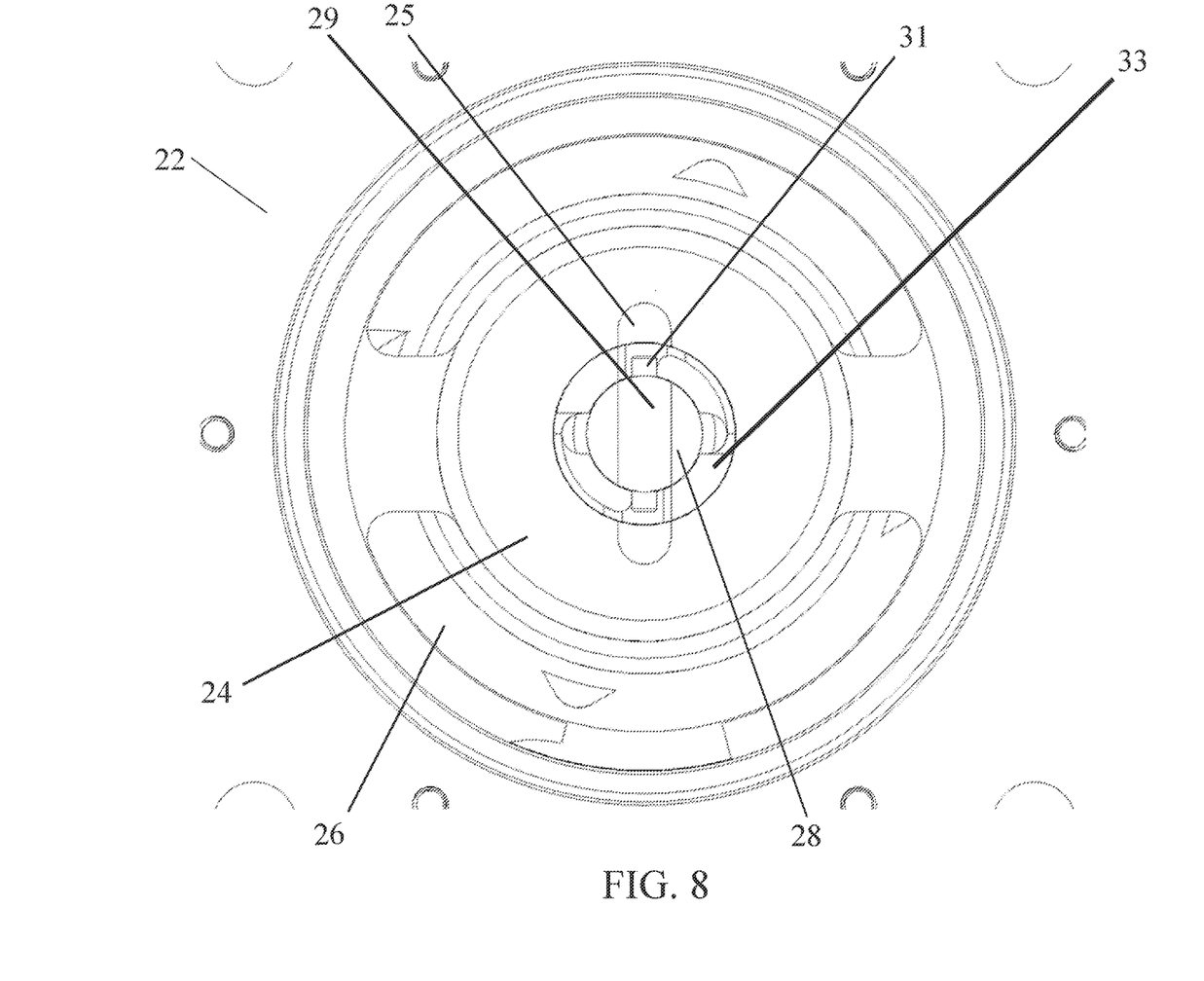
FIG. 8 is an enlarged front view of the exemplary body portion of FIG. 5 with certain components removed for clarity.
Figure 9:
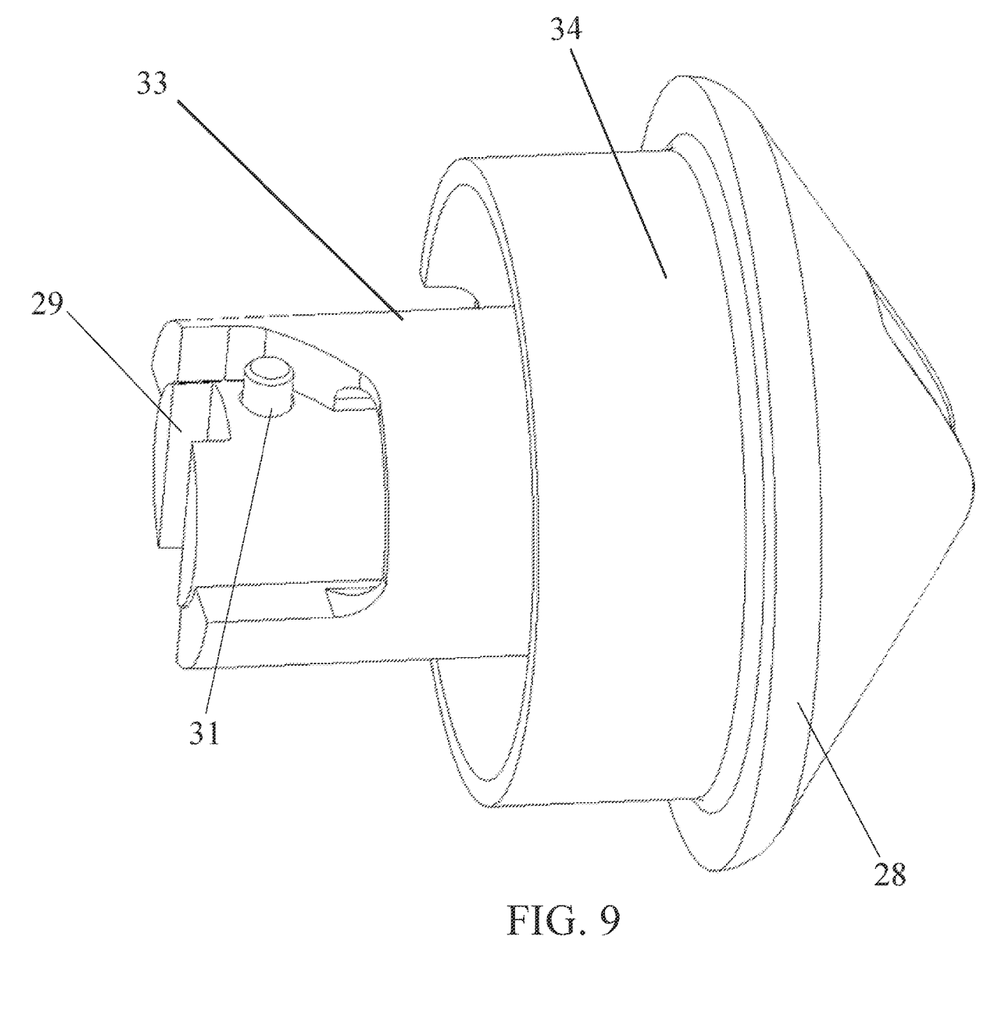
FIG. 9 is a perspective view of an exemplary valve mechanism of the exemplary self-sealing breakaway valve.
Figure 10:
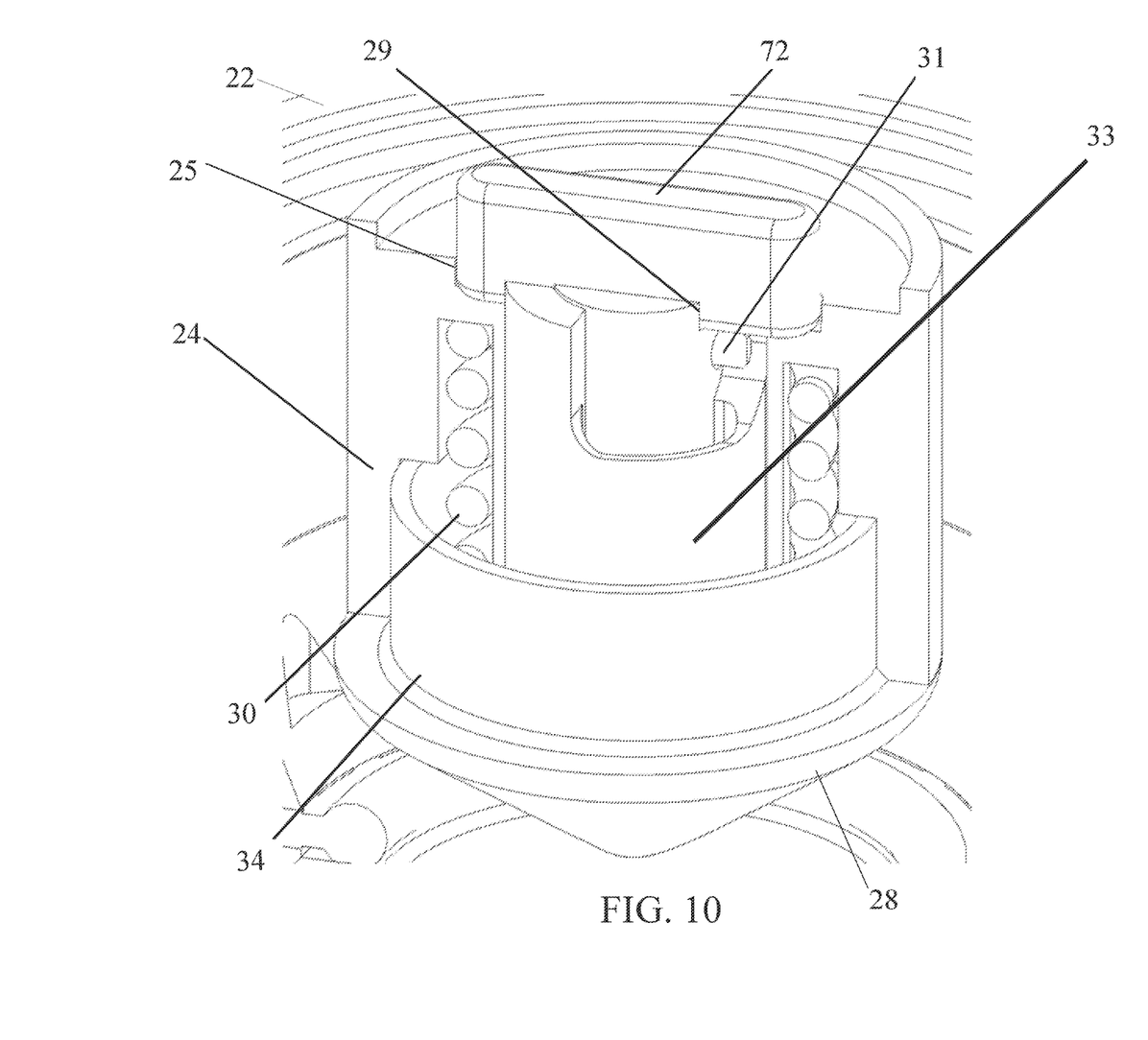
FIG. 10 is an enlarged partial cross-sectional view of the exemplary body portion of FIG. 5.

Referring now to FIGS. 3 and 4, when the breakaway valve 10 is in the closed configuration, the pop-up visual indicators 36, 62 will extend above the first body portion 12 and second body portion 14. In the open configuration (FIG. 2), the ring extensions 34, 60 of the valve mechanisms 28, 54 engage with the foot portion 38, 64 of the pop-up visual indicators 36, 62 in order to retain the pop-up visual indicators 36, 62 in a position below the first body portion 12 and the second body portion 14. As the valve springs 30, 56 urge the valve mechanisms 28, 54 away from the pop-up visual indicators 36, 62 the ring extensions 34, 60 are disengaged from the foot portions 38, 64, and the visual indicator springs 40, 66 urge the pop-up visual indicators 36, 62 above the first body portion 12 and second body portion 14 in order to reflect that the breakaway valve 10 is in the closed configuration.

It will thus be seen that the objects set forth above, among those made apparent from the preceding description, are efficiently attained and, since certain changes may be made in the above article without departing from the scope of this invention, it is intended that all matter contained in this disclosure or shown in the accompanying drawings, shall be interpreted, as illustrative and not in a limiting sense. It is to be understood that all of the present figures, and the accompanying narrative discussions of corresponding embodiments, do not purport to be completely rigorous treatments of the invention under consideration. It is to be understood that the above-described arrangements are only illustrative of the application of the principles of the present invention. Numerous modifications and alternative arrangements may be devised by those skilled in the art without departing from the scope of the present invention.

What is claimed is:

1. A breakaway valve, comprising:
  a first body portion having a first coupling end defining a first opening and a first centerbody positioned within the first body portion;
  a second body portion frangibly coupled to the first body portion and having a second coupling end defining a second opening and a second centerbody positioned within the second body portion;
  a first valve mechanism movable between the first centerbody and the first opening;
  a second valve mechanism movable between the second centerbody and the second opening;
  a first valve spring positioned between the first valve mechanism and first centerbody and configured to urge the first valve mechanism in a direction towards the first opening;
  a second valve spring positioned between the second valve mechanism and second centerbody and configured to urge the second valve mechanism in a direction towards the second opening;
  a first pin operatively coupled to the first valve mechanism and engaged with a first ramp positioned within the first centerbody so movement of the first valve mechanism by the first valve spring in the direction towards the first opening results in rotational movement of the first valve mechanism about the longitudinal axis of the first valve mechanism;
  a second pin operatively coupled to the second valve mechanism and engaged with a second ramp positioned within the second centerbody configured so movement of the second valve mechanism by the second valve spring in the direction towards the second opening results in rotational movement of the second valve mechanism about the longitudinal axis of the second valve mechanism; and a coupling key configured to operatively engage with the first valve mechanism and the second valve mechanism to inhibit rotational movement of the first valve mechanism about the longitudinal axis of the first valve mechanism and rotational movement of the second valve mechanism about the longitudinal axis of the second valve mechanism.

2. The breakaway valve according to claim 1, wherein the first body portion and the second body portion are coupled together by one or more frangible fasteners to define a flow path through the breakaway valve from the first opening to the second opening.

3. The breakaway valve according to claim 1, wherein the first body portion comprises a first flange positioned around the periphery of the first body portion, wherein the second body portion comprises a second flange positioned around the periphery of the second body portion, and wherein the first flange and second flange are configured to couple the first body portion and the second body portion together by one or more frangible fasteners.

4. The breakaway valve according to claim 1, wherein the first centerbody comprises at least one recess configured for receipt of the coupling key, wherein the first valve mechanism comprises a notch configured for receipt of the coupling key, and wherein when the coupling key is aligned in the at least one recess and the notch rotational movement of the first valve mechanism about the longitudinal axis of the first valve mechanism is inhibited.

5. The breakaway valve according to claim 1, wherein the second centerbody comprises at least one recess configured for receipt of the coupling key, wherein the second valve mechanism comprises a notch configured for receipt of the coupling key, and wherein when the coupling key is aligned in the at least one recess and the notch rotational movement of the second valve mechanism about the longitudinal axis of the second valve mechanism is inhibited.

6. The breakaway valve according to claim 1, wherein the first pin and the first ramp have a cam engagement such that first pin follows a contour surface of the first ramp to impart rotational movement to the first valve mechanism, and wherein the second pin and the second ramp have a cam engagement such that the second pin follows a contour surface of the second ramp to impart rotational movement to the second valve mechanism.

7. The breakaway valve according to claim 2, further comprising a first face seal positioned between the first opening and the first valve mechanism, and wherein the first valve mechanism is configured to cause closure of the flow path when urged against the first face seal by the first valve spring.

8. The breakaway valve according to claim 7, further comprising a second face seal positioned between the second opening and the second valve mechanism, and wherein the second valve mechanism is configured to cause closure of the flow path when urged against the second face seal by the second valve spring.

9. The breakaway valve according to claim 1, wherein the first valve spring is configured to move the first valve mechanism rectilinearly along the longitudinal axis of the first valve mechanism, and wherein the second valve spring is configured to move the second valve mechanism rectilinearly along the longitudinal axis of the second valve mechanism.

10. The breakaway valve according to claim 9, wherein the engagement between the first pin and the first ramp inhibits rectilinear movement of the first valve mechanism when the coupling key is operatively engaged with the first valve mechanism, and wherein the engagement between the second pin and the second ramp inhibits rectilinear movement of the second valve mechanism when the coupling key is operatively engaged with the second valve mechanism.

11. The breakaway valve according to claim 10, wherein the coupling key is configured for disengagement from the first valve mechanism when the first body portion is separated from the second body portion.

12. The breakaway valve according to claim 10, wherein the coupling key is configured for disengagement from the second valve mechanism when the second body portion is separated from the first body portion.

13. The breakaway valve according to claim 5, wherein the coupling key is configured for disengagement from the at least one recess and/or the notch when the first body portion is separated from the second body portion.

14. The breakaway valve according to claim 6, wherein the coupling key is configured for disengagement from the at least one recess and/or the notch when the second body portion is separated from the first body portion.

15. The breakaway valve according to claim 13, wherein disengagement of the coupling key from the at least one recess and/or the notch allows for rotational movement of the first valve mechanism about the longitudinal axis of the first valve mechanism and urging of the first valve mechanism towards the first opening by the first valve spring.

16. The breakaway valve according to claim 14, wherein disengagement of the coupling key from the at least one recess and/or the notch allows for rotational movement of the second valve mechanism about the longitudinal axis of the second valve mechanism and urging of the second valve mechanism towards the second opening by the second valve spring.

17. The breakaway valve according to claim 1, further comprising a first pop-up visual indicator movable between an extended position above the first body portion and a retracted position below the first body portion, and a second pop-up visual indicator movable between an extended position above the second body portion and a retracted position below the second body portion.

18. The breakaway valve according to claim 17, wherein the first pop-up visual indicator is configured to be in the extended position when the first valve spring moves the first valve mechanism in the direction of the first opening, and wherein the second pop-up visual indicator is configured to be in the extended position when the second valve spring moves the second valve mechanism in the direction of the second opening.

* * * * *